April 15, 1969   J. E. POUNDERS   3,438,645
CARPET DOLLY
Filed May 10, 1967
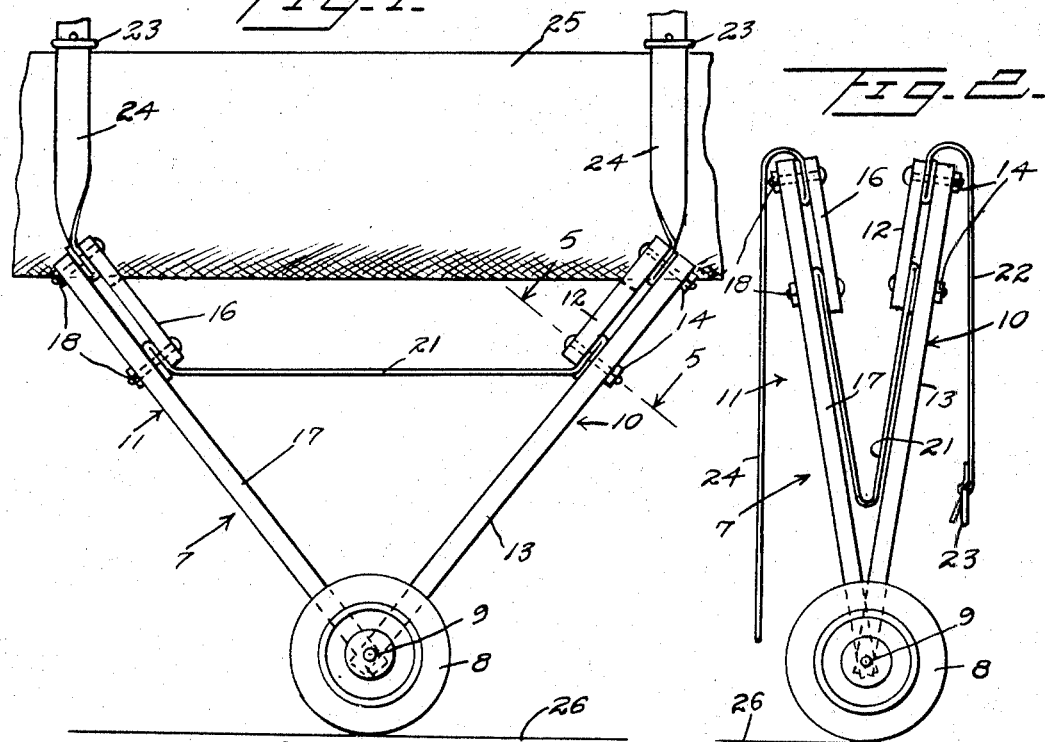
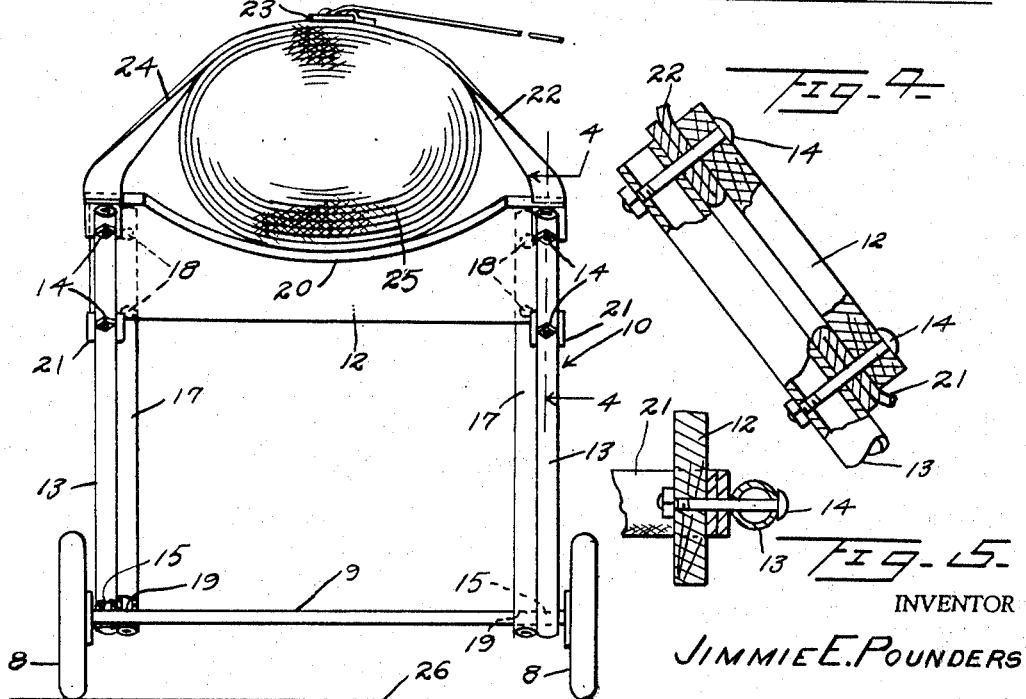
INVENTOR
JIMMIE E. POUNDERS
BY John N. Randolph
ATTORNEY United States Patent Office 3,438,645
Patented Apr. 15, 1969

3,438,645
CARPET DOLLY
Jimmie E. Pounders, 8717A Garvin,
Berkeley, Mo. 63134
Filed May 10, 1967, Ser. No. 637,604
Int. Cl. B62d *21/14;* B62b *1/04, 3/02*
U.S. Cl. 280—41                                           1 Claim

ABSTRACT OF THE DISCLOSURE

A two wheel dolly for supporting rolled carpets, rugs and similar items to enable such items to be readily moved about without being manually supported. The dolly is detachably secured to the carpet or rug to be lifted therewith for movement over curbs or up and down stairs. Two supporting sections of the dolly are foldable relative to one another when the dolly is not in use.

Background of the invention

This invention relates to land vehicles of the two wheeled folding type.

The prior art includes two-wheeled vehicles for transport purposes and which may be folded.

Summary

It is a primary object of the present invention to provide a transport dolly of extremely simple construction having two wheels and including two support sections which are capable of being folded relative to one another for convenient storage of the dolly when not in use.

Another object of the invention is to provide a dolly wherein the support sections may readily be extended to a predetermined extent for use and will be maintained in an extended position by the weight of a rolled carpet or the like supported thereon.

Still another object of the invention is to provide a dolly having means for detachably securing the rolled item thereon and so that the dolly can be lifted with such item for passage over curbs or up and down stairways.

Various other objects and advantages of the invention will hereinafter become more fully apparent from the following description of the drawing, illustrating a presently preferred embodiment thereof, and wherein:

Brief description of the drawing

FIGURE 1 is a side elevational view showing the dolly extended and in use;

FIGURE 2 is a side elevational view showing the dolly in a partially folded position;

FIGURE 3 is an end elevational view looking from right to left of FIGURE 1;

FIGURE 4 is an enlarged fragmentary sectional view taken substantially along a plane as indicated by the line 4—4 of FIGURE 3, and FIGURE 5 is an enlarged fragmentary cross sectional view taken substantially along a plane as indicated by the line 5—5 of FIGURE 1.

Description of the preferred embodiment

Referring more specifically to the drawing, the carpet dolly in its entirety and comprising the invention is designated generally 7 and includes a pair of wheels 8 equipped with rubber tires and which are journaled on the ends of an axle 9, and a pair of support sections 10 and 11 which are supported by and extend upwardly from the axle.

The support section 10 includes a rigid cross member 12 which is secured at its ends to the upper ends of a pair of legs 13 by nut and bolt fastenings 14. Each leg 13 is secured by two fastenings 14 to the cross piece 12 and is disposed crosswise thereof. The lower ends of the legs 13 have openings 15, FIGURE 3, through which the axle 9 extends and which are disposed thereon inwardly of and adjacent the wheels 8.

The support section 11 includes a cross member 16, corresponding to the member 12, and a pair of legs 17, corresponding to the legs 13, which are secured to the cross member 16 by nut and bolt fastenings 18. The support sections 10 and 11 differ from one another only in that the legs 17 are secured to the cross member 16 further from the ends of said cross member than the legs 13 which are secured adjacent the ends of the cross member 12, as seen in FIGURE 3, so that the axle 9 can extend through openings 19 in the lower ends of the legs 17 for positioning said legs thereon between the legs 13. The cross members 12 and 16 have corresponding concavely recessed upper edges 20, as seen in FIGURE 3.

The legs 13 and 17 each preferably comprises a metal tube, and the cross members 12 and 16 are each preferably formed of wood, as seen in FIGURES 4 and 5.

Non-elastic flexible tapes 21 extend between corresponding ends of the cross pieces 12 and 16, and are clamped between said cross pieces and the legs which extend therefrom by the lower fastenings 14 and 18 which extend therethrough. A non-elastic flexible strap 22 has one end secured in the same manner between an end of the cross piece of each section and one leg thereof by an upper fastening 14 or 18 and said strap 22 has a buckle 23 at its other free end. One end of a non-elastic flexible strap 24 is secured in the same manner to the other end of the cross piece of each support section.

FIGURE 2 shows the dolly 7 in a partially folded position. The two support sections 10 and 11 may be moved further toward one another to position the cross members 12 and 16 in substantially abutting engagement. From the folded position, the dolly is extended by swinging the support sections 10 and 11 away from one another until the tapes 21 become taut and prevent any further outward movement of said sections. The intermediate portion of a rolled carpet or rug 25 is then positioned on the recessed upper edges 20 of the cross members 12 and 16 so that the carpet or rug will be disposed crosswise of said cross members. The straps 22 and 24 of each support section 10 and 11 are then secured over the carpet or rug 25 by the buckle 23 thereof, as illustrated in FIGURES 1 and 3.

One or two workmen, not shown, while balancing the rolled carpet or rug 25 on the dolly 7 may transport it in either direction, to the right or left of FIGURE 1, by pushing or pulling the rug for propelling the wheels 8 of the dolly 7 over a floor or other supporting surface 26, for thus transporting the carpet or rug without the necessity of lifting and with the weight thereof supported almost entirely by the dolly. The rug or carpet 25 can be lifted with the dolly 7 which is fastened thereto for movement over curbs or up and down stairways, not shown. It will also be readily apparent that the dolly 7 is adapted and capable of transporting other heavy items which are capable of being rolled or which are of a long and slender configuration.

Various modifications and changes are contemplated and may be resorted to, without departing from the function or scope of the invention as hereinafter defined by the appended claim.

I claim as my invention:

1. In combination with a long slender object to be transported, such as a rolled carpet, a dolly comprising an axle, wheels journaled on said axle in spaced apart relation to one another, a pair of support sections each including a pair of legs having lower ends pivotally mounted on the axle, between the wheels, and a rigid cross member extending between and secured to upper portions of said legs and maintaining the legs in spaced apart parallel relation to one another, said cross member being of substantial width and disposed in a plane parallel to the plane of said legs, non-elastic flexible means extending between and connecting the support sections, remote from the lower ends of the legs, to permit the support sections to assume a folded position in substantially abutting engagement with one another, or an extended operative position in upwardly diverging relation to one another and with said non-elastic flexible means extending taut therebetween, said cross members being inclined upwardly and outwardly relative to one another in the extended position of the dolly and having arcuately recessed upper edges engaged by intermediate portions of said object for supporting the object thereon while being transported, the weight of the object maintaining the dolly in an extended operative position, at least one end portion of the object being manually engaged for balancing, propelling and steering the dolly, and strap members secured to the ends of each cross member and fastened over the object for securing the dolly thereto to permit lifting of the dolly therewith.

References Cited

UNITED STATES PATENTS

| 2,228,046 | 1/1941 | Bird | 280—41 |
| 2,546,604 | 3/1951 | Lafky | 280—41 |
| 2,581,417 | 1/1952 | Jones | 280—41 |
| 2,681,740 | 6/1954 | Schueller | 280—41 X |
| 2,811,367 | 10/1957 | Goodale | 280—41 |
| 2,918,296 | 12/1959 | Goodale | 280—41 |

BENJAMIN HERSH, *Primary Examiner.*

JOEL E. SIEGEL, *Assistant Examiner.*